(12) United States Patent
Kanda et al.

(10) Patent No.: US 6,257,199 B1
(45) Date of Patent: Jul. 10, 2001

(54) DIRECT FUEL INJECTION-TYPE SPARK-IGNITION INTERNAL COMBUSTION ENGINE

(75) Inventors: Mutsumi Kanda; Toshimi Kashiwagura, both of Susono; Fumiaki Hattori, Mishima; Yoshihiro Nomura, Aichi-gun, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/543,086

(22) Filed: Apr. 4, 2000

(30) Foreign Application Priority Data

Apr. 9, 1999 (JP) .................................................. 11-102760

(51) Int. Cl.$^7$ ...................................................... F02B 3/04
(52) U.S. Cl. ........................................... 123/298; 123/305
(58) Field of Search ...................................... 123/298, 305

(56) References Cited

U.S. PATENT DOCUMENTS

| | | | |
|---|---|---|---|
| 5,720,753 | * | 2/1998 | Matoba et al. ........................ 123/298 |
| 5,806,482 | * | 9/1998 | Igarashi et al. ...................... 123/305 |
| 5,915,353 | * | 6/1999 | Matsumura ........................... 123/305 |
| 6,035,822 | * | 3/2000 | Suzuki et al. ........................ 123/298 |
| 6,035,823 | * | 3/2000 | Koike et al. ......................... 123/298 |
| 6,125,817 | * | 10/2000 | Piock et al. .......................... 123/305 |
| 6,125,818 | * | 10/2000 | Okamoto et al. ..................... 123/305 |
| 6,186,113 | * | 2/2001 | Hattori et al. ....................... 123/298 |

FOREIGN PATENT DOCUMENTS 9-158736    6/1997    (JP) .

* cited by examiner

*Primary Examiner*—Erick Solis
(74) *Attorney, Agent, or Firm*—Oliff & Berridge, PLC

(57) ABSTRACT

A direct fuel injection-type spark ignition internal combustion engine is disclosed. The engine comprises a spark plug arranged in the upper wall of the cylinder, a fuel injector for directly injecting fuel into the cylinder, and a cavity formed in the top surface of the piston. The cavity has a bottom wall and a spark plug side wall. Fuel injected into the cavity from the fuel injector in the latter half of the compression stroke proceeds on the bottom wall of the cavity so as to be deflected by the spark plug side wall and led to the vicinity of the spark plug. In the engine, the fuel injector injects fuel in the shape of a fan having a relatively small thickness. The cavity has guide walls for preventing fuel from excessively spreading in the direction of width of the fan shape as it proceeds on the bottom wall.

4 Claims, 2 Drawing Sheets

DIRECT FUEL INJECTION-TYPE SPARK-IGNITION INTERNAL COMBUSTION ENGINE

BACKGROUND OF THE INVENTION

1. Field of the Invention

The present invention relates to a direct fuel injection-type spark-ignition internal combustion engine.

2. Description of the Related Art

In a direct fuel injection-type spark-ignition internal combustion engine having a fuel injector for injecting fuel directly into a cylinder, fuel is injected into a cavity formed in the top surface of a piston in the last stage of the compression stroke, is vaporized by utilizing the heat of the high temperature air in the cylinder and of the piston, and is led to the vicinity of the spark plug to form a combustible mixture that can be favorably ignited in the vicinity of only the spark plug at the ignition timing. Thus, stratified charge combustion which can burn a total lean mixture in the cylinder is realized.

In general, as a direct fuel injection-type spark-ignition internal combustion engine disclosed in Japanese Unexamined Patent Publication (Kokai) No. 9-158736, the fuel injector is arranged in the upper periphery of the cylinder on the side of the intake port and the spark plug is arranged nearly at the center in the upper part of the cylinder. The cavity formed in the top surface of the piston has a bottom wall with which the fuel injected from the fuel injector will come into collision and a spark plug side wall. Due to the spark plug side wall, fuel proceeding along the bottom wall after collision is deflected to the vicinity of the spark plug.

In the above art, the fuel injector injects fuel in the shape of a flat fan having a relatively small thickness, and fuel proceeding on the bottom wall of the cavity spreads in the direction of width and is easily vaporized by absorbing heat from a wide area of the bottom wall. The spark plug side wall of the cavity has an arcuate shape in a plan view. Therefore, in the central part of fuel in the direction of width thereof, a velocity vector proceeding on the bottom wall is changed into an upward velocity vector by the spark plug side wall, and thus it is directed toward the vicinity of the spark plug. Further, both side parts of fuel in the direction of width thereof collide with the spark plug side wall at an acute angle, whereby a velocity vector proceeding on the bottom wall is converted by the spark plug side wall into a resultant velocity vector of the upward velocity vector and the velocity vector in the central direction, and thus they are directed toward the vicinity of the spark plug. Thus, fuel favorably vaporized and spreading in the direction of width is expected to collect near the spark plug to form a favorable combustible mixture near the spark plug.

Undoubtedly, fuel can be easily vaporized by being injected in the shape of a fan so as to spread in the direction of width as it proceeds on the bottom wall of the cavity. However, on the other hand, fuel in the shape of a fan tends to be spread excessively in the direction of width on the bottom wall of the cavity, particularly, both side parts of the fuel tend to be excessively dispersed.

As described above, each part of fuel in the direction of width thereof is directed to the vicinity of the spark plug by the spark plug side wall of the cavity. However, it is difficult to correctly direct each part of fuel to the same position. In practice, the mixtures formed by all the parts of the fuel are joined together near the spark plug. In order to reliably ignite the joined mixture, therefore, the mixture formed by each part of the fuel must be a combustible mixture that can be favorably ignited.

However, when the both side parts of the fuel are excessively dispersed on the bottom wall of the cavity, the mixture formed by these parts of the fuel becomes very lean and does not favorably burn, making it difficult to produce the engine output as intended and, besides, unburned fuel is emitted in increased amounts.

SUMMARY OF THE INVENTION

It is therefore an object of the present invention to provide a direct fuel injection-type spark-ignition internal combustion engine which uses a fuel injector for injecting fuel in the shape of a flat fan having a relatively small thickness, and the fuel injected into a cavity formed in the top surface of a piston in the latter half of the compression stroke proceeds on the bottom wall of the cavity so as to be led to the vicinity of the spark plug by a spark plug side wall, wherein a combustible mixture is formed by all the fuel injected into the cavity and the mixture can be reliably ignited and burned to realize favorable stratified charge combustion.

According to the present invention, provided is a direct fuel injection-type spark-ignition internal combustion engine comprising a spark plug arranged in the upper wall of the cylinder, a fuel injector for directly injecting fuel into the cylinder, and a cavity formed in the top surface of the piston, the cavity having a bottom wall and a spark plug side wall, and the fuel injected into the cavity from the fuel injector in the latter half of the compression stroke proceeding on the bottom wall of the cavity so as to be deflected by the spark plug side wall and led to the vicinity of the spark plug, wherein the fuel injector injects fuel in the shape of a fan having a relatively small thickness, and the cavity has guide walls for preventing fuel from excessively spreading in the direction of width as it proceeds on the bottom wall.

The present invention will be more fully understood from the description of preferred embodiments of the invention set forth below, together with the accompanying drawings.

DESCRIPTION OF THE PREFERRED EMBODIMENT

Figure 1:
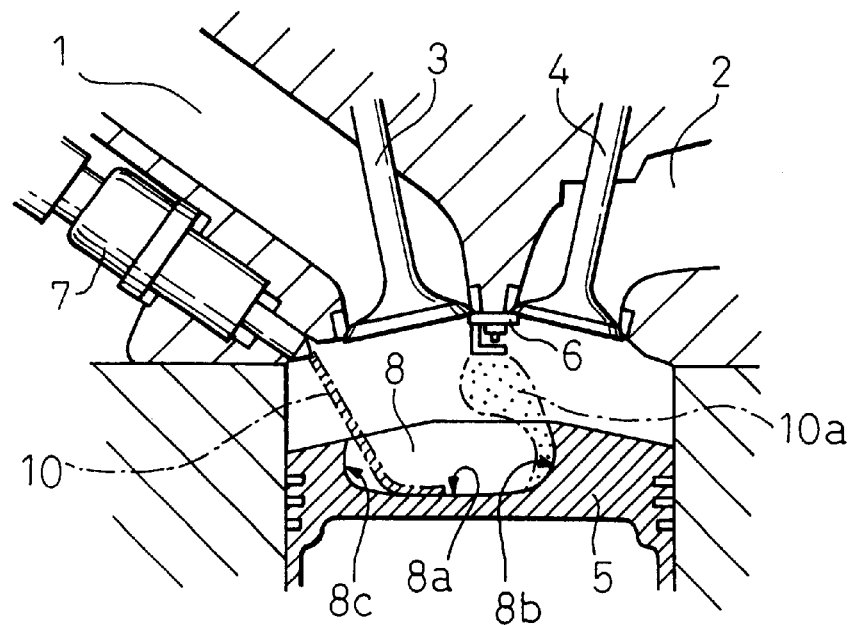
FIG. 1 is a vertical sectional view schematically illustrating a main part of a direct fuel injection-type spark-ignition internal combustion engine according to a first embodiment of the present invention.
Figure 2:
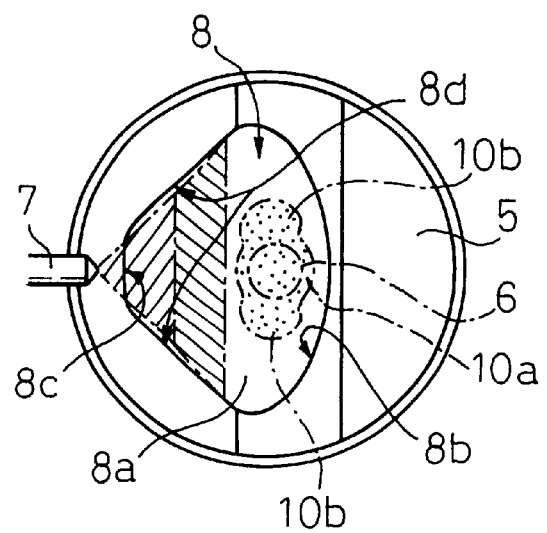
FIG. 2 is a plan view of a piston of FIG. 1.

FIG. 1 is a vertical sectional view schematically illustrating a main part of a direct fuel injection-type spark-ignition internal combustion engine according to a first embodiment of the present invention. FIG. 2 is a plan view of a piston in FIG. 1. In these drawings, reference numeral 1 denotes an intake port and 2 denotes an exhaust port. The intake port 1 connects to the cylinder via an intake valve 3, and the exhaust port 2 connects to the cylinder via an exhaust valve 4. Reference numeral 5 denotes a piston having a concave cavity 8 formed in the top surface thereof. Reference numeral 6 denotes a spark plug arranged near to the central upper part of the cylinder, and 7 denotes a fuel injector for injecting fuel directly into the cylinder from the upper periphery of the cylinder. The fuel injector 7 is arranged on the side of the intake port 1 where the temperature is relatively low due to the flow of the intake air in the cylinder in order to prevent fuel from being vaporized in the fuel injector 7.

The fuel injector 7 has a slit-like injection hole and injects fuel in the shape of a fan having a small thickness. In order to carry out stratified charge combustion, as shown in FIG. 1, fuel is injected into the cavity 8 formed in the top surface of the piston 5 in the last stage of the compression stroke. Fuel 10 just after the injection, as represented by a hatched area, is in the form of a liquid, proceeds along the bottom wall 8a of the cavity 8, is vaporized until it is led to the vicinity of the spark plug 6 by the spark plug side wall 8b of the cavity 8, and forms a combustible mixture that can be favorably ignited as represented by a dotted area. Thus, the combustible mixture is formed only in the vicinity of the spark plug 6 in an attempt to realize the stratified charge combustion which makes it possible to burn a lean mixture in the whole cylinder.

The thin fan-shaped fuel spray spreads in the direction of width as it proceeds along the bottom wall 8a of the cavity 8 and is easily vaporized by favorably absorbing heat from a wide area of the bottom wall 8a of the cavity 8. The spark plug side wall 8b of the cavity 8 has an arcuate shape in a plan view and, hence, in the central part of the fuel in the direction of width thereof, a velocity vector along the bottom wall 8a is converted into an upward velocity vector by the spark plug side wall 8b, and thus the central part of the fuel can be directed to the vicinity of the spark plug 6. Further, the both side parts of fuel in the direction of width thereof collide with the spark plug side wall 8b at an acute angle in a plan view, and a velocity vector along the bottom wall 8a is converted, by the spark plug side wall 8b, into a resultant of an upward velocity vector and a velocity vector toward the center in the direction of width of the fuel, and thus these parts of fuel can be directed to the vicinity of the spark plug 6.

However, it is difficult to correctly direct each part of the fuel to the same position near the spark plug 6 using the spark plug side wall 8b. Generally, therefore, as shown in FIG. 2, the mixture 10a formed by the central part of the fuel and the mixture 10b formed by both side parts of the fuel are joined together near the spark plug 6. In order to reliably ignite and burn such joined mixtures, therefore, the mixtures 10a and 10b formed by every part of the fuel must be combustible mixtures that can be favorably ignited.

However, a general cavity that is formed in the top surface of the piston has a sufficiently large space in the direction of width for fuel proceeding along the bottom wall and spreading in the direction of width. Accordingly, fuel proceeding along the bottom wall of the cavity tends to excessively spread in the direction of width. Therefore, the both side parts of the fuel tends to be excessively dispersed.

The mixture 10b formed by both excessively dispersed side parts of the fuel is very lean. Therefore, even when the mixture 10a formed by the central part of the fuel is reliably ignited, flame does not favorably propagate through the mixture 10b, all the fuel injected into the cavity 8 is not favorably burned as the combustible mixture, the engine output is not obtained as intended, and unburned fuel is emitted in increased amounts.

In order to solve this problem, according to this embodiment, the cavity 8 has guide walls 8d for preventing the fuel proceeding on the bottom wall 8a from excessively spreading in the direction of width. The guide walls 8d are two nearly vertical flat side walls extending at an angle equal to, or slightly larger than, the contained angle of the fan of fuel injected from the fuel injector 7, and are smoothly connected to the spark plug side wall 8b and to the fuel injector side wall 8c. Further, the guide walls and the bottom wall 8a are connected together by an arc of a very small radius or by a cornered portion, and the distance between the two guide walls 8d is slightly larger than the width of the fuel spray at a position where fuel collides with the bottom wall 8a.

Thus, the fuel injected from the fuel injector 7 comes into collision with the bottom wall 8a without coming in contact with the guide walls 8d. Thereafter, the fuel proceeds on the bottom wall 8a toward the spark plug side wall 8b spreading in the direction of width. At this time, if the fuel tends to spread by more than the contained angle of the fan, it is readily limited by the guide walls 8d as shown in FIG. 2; i.e., the fuel is prevented from spreading unnecessarily and both side parts of the fuel are not excessively dispersed. Accordingly, the mixture formed near the spark plug 6 is not lean, and favorable stratified charge fuel combustion can be realized.

At the time when the fuel injected from the fuel injector 7 collides with the bottom wall 8a of the cavity 8, the fuel partly may proceed to the side of the fuel injector 7 along the bottom wall 8a. If the two guide walls 8d are extending by more than a predetermined length on the side of the fuel injector 7, and for example, if the fuel injector side wall 8c is not provided, the fuel proceeding along the bottom wall 8a toward the side of the fuel injector 7 can be made narrow and vigorously rises to directly hit the fuel injector 7. Accordingly, a deposit may be formed on the injection hole of the fuel injector 7. In this embodiment, therefore, the two guide walls 8d are not extended on the side of the fuel injector 7, and the fuel injector side wall 8c is provided to be opposed to the spark plug side wall 8b. Therefore, even if the fuel proceeding on the bottom wall 8a toward the side of the fuel injector 7 rises along the fuel injector side wall 8c, its energy is small and the fuel rises to a position closer to the spark plug 6 than the injection hole of the fuel injector without causing the above-mentioned problem.

In this embodiment, the guide walls 8d of the cavity 8 connect the spark plug side wall 8b to the fuel injector side wall 8c, however, this is not to limit the invention. For example, guide walls having the above-mentioned function may be provided on the inside of the side walls connecting the spark plug side wall 8b to the fuel injector side wall 8c. In this case, the height of the guide wall may be smaller than the depth of the cavity.

Figure 3:
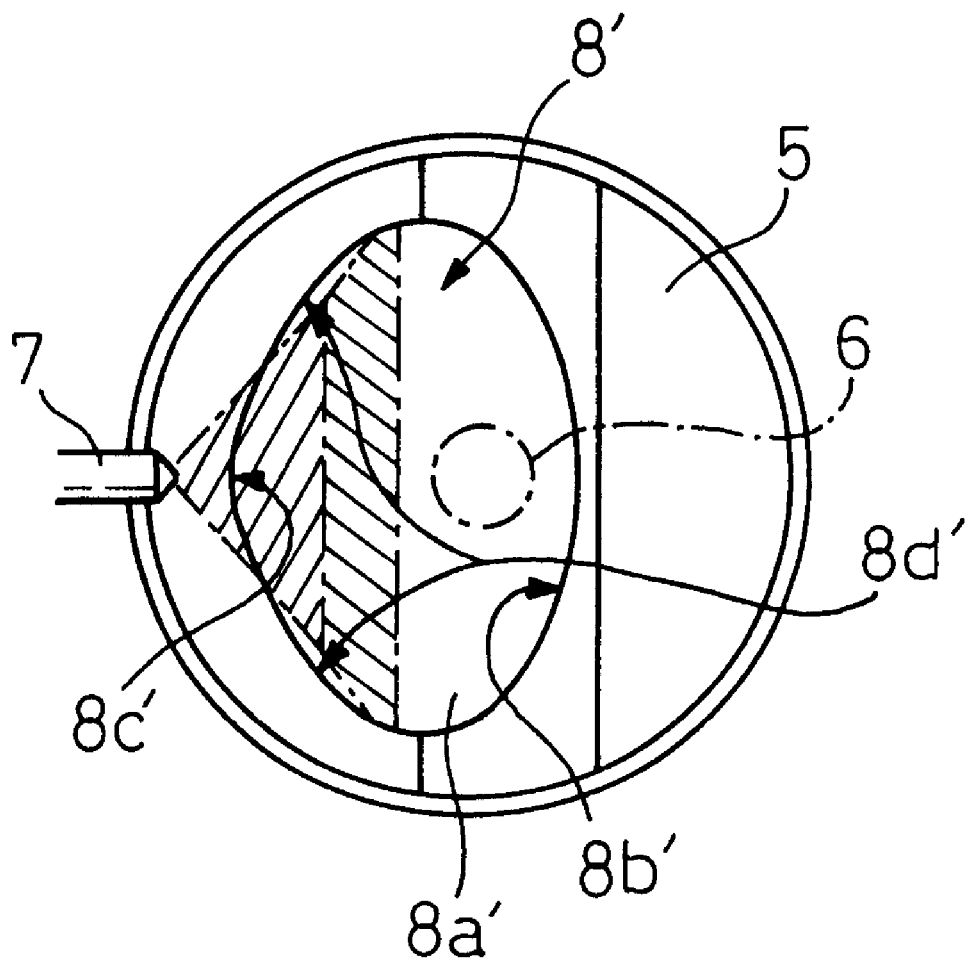
FIG. 3 is a plan view of the piston representing a second embodiment of the direct fuel injection-type spark-ignition internal combustion engine according to the present invention.

FIG. 3 is a plan view of a piston representing a second embodiment of the direct fuel injection-type spark-ignition internal combustion engine according to the present invention. Only the difference from the first embodiment is described below. In this embodiment, the guide walls 8d' of the cavity 8' connect the spark plug side wall 8b' to the fuel injector side wall 8c' and the guide wall 8d' and the fuel injector side wall 8c' have an arcuate shape being formed integrally together in a plan view.

The radius of the arcuate shape is so selected that the fuel injected from the fuel injector 7 comes into collision with the bottom wall 8a' without coming into contact with the guide walls 8d' and that the guide walls 8d' work to guide the fuel that proceeds toward the spark plug side wall 8b, spreading on the bottom wall 8a' in the direction of width.

Thus, the present embodiment makes it possible to obtain the effect same as that of the first embodiment. In this embodiment, further, the cavity 8' has a shape close to a circle in a plan view, compared with that of the first embodiment. In stratified charge combustion in which the combustible mixture near the spark plug 6 is ignited and burned, therefore, flame easily propagates throughout the whole air in the cavity, enhancing the combustion speed.

In this embodiment, the cavity in the top surface of the piston has a distinctive shape and includes the bottom wall with which fuel comes into collision, the spark plug side wall for leading fuel proceeding on the bottom wall to the vicinity of the spark plug and the fuel injector side wall located on the side opposite to the spark plug side wall. This, however, is not to limit the invention. For example, even when the cavity has a nearly hemispherical shape, and the bottom wall, the spark plug side wall and the fuel injector side wall cannot be distinguished in shape, in the present invention, a portion of the cavity where fuel comes into collision is intended to be the bottom wall, a portion of the cavity for leading fuel proceeding on the bottom wall toward the vicinity of the spark plug is intended to be the spark plug side wall, and a portion of the cavity facing the spark plug side wall is intended to be the fuel injector side wall.

What is claimed is:

1. A direct fuel injection-type spark-ignition internal combustion engine comprising a spark plug arranged in the upper wall of the cylinder, a fuel injector for directly injecting fuel into the cylinder, and a cavity formed in the top surface of the piston, said cavity having a bottom wall and a spark plug side wall, and fuel injected into said cavity from said fuel injector in the latter half of the compression stroke proceeding along said bottom wall of said cavity so as to be deflected by said spark plug side wall and led to the vicinity of said spark plug, wherein said fuel injector injects fuel in the shape of a fan having a relatively small thickness and said cavity has guide walls for preventing fuel from excessively spreading in the direction of width of the fan shape as it proceeds on said bottom wall.

2. A direct fuel injection-type spark-ignition internal combustion engine according to claim 1, wherein the fuel injected by said fuel injector has the thickness smaller than the width of said fan shape thereof.

3. A direct fuel injection-type spark-ignition internal combustion engine according to claim 1, wherein said guide walls are two nearly vertical flat side walls extending at an angle nearly equal to the contained angle of the fan of fuel injected from said fuel injector and, at a position where the fuel injected from said fuel injector arrives at said bottom wall of said cavity, the distance between said two flat side walls is slightly larger than the width of said fuel.

4. A direct fuel injection-type spark-ignition internal combustion engine according to claim 1, wherein said spark plug side wall of said cavity has an arcuate shape in a plan view, said guide walls connect said spark plug side wall to a fuel injector side wall positioned on the side opposite to the spark plug side wall, said guide walls and said fuel injector side wall have an arcuate shape formed integrally together in a plan view, and the radius of said arcuate shape is selected so that the fuel injected from said fuel injector arrives on said bottom wall without coming in contact with said guide walls.

* * * * *